United States Patent [19]

Hochmuth et al.

[11] Patent Number: 5,325,485

[45] Date of Patent: Jun. 28, 1994

[54] METHOD AND APPARATUS FOR DISPLAYING PRIMITIVES PROCESSED BY A PARALLEL PROCESSOR SYSTEM IN A SEQUENTIAL ORDER

[75] Inventors: Roland M. Hochmuth, Woodstock; Douglas P. Moore, Kingston; David C. Tannenbaum, Hurley, all of N.Y.

[73] Assignee: International Business Machines Corporation, Armonk, N.Y.

[21] Appl. No.: 969,640

[22] Filed: Oct. 30, 1992

[51] Int. Cl.$^5$ ............................................. G09G 5/00
[52] U.S. Cl. ..................................... 395/163; 395/122
[58] Field of Search ................ 395/162, 163, 121, 122, 395/165, 130; 382/49; 364/133; 358/240; 345/139, 147, 193

[56] References Cited

U.S. PATENT DOCUMENTS

| | | | |
|---|---|---|---|
| 4,648,045 | 3/1987 | Demetrescu | 364/518 |
| 4,658,247 | 4/1987 | Gharachorloo | 340/747 |
| 4,737,921 | 4/1988 | Goldwasser | 364/518 |
| 4,742,552 | 5/1988 | Andrews | 382/41 |
| 4,827,445 | 5/1989 | Fuchs | 364/900 |
| 4,885,703 | 12/1989 | Deering | 364/522 |
| 4,949,280 | 8/1990 | Littlefield | 364/518 |
| 4,951,232 | 8/1990 | Hannah | 364/522 |
| 4,958,303 | 9/1990 | Assarpour et al. | 364/521 |

Primary Examiner—Dale M. Shaw
Assistant Examiner—Ulka Chauhan
Attorney, Agent, or Firm—Duke W. Yee; Andrew J. Dillon

[57] ABSTRACT

A method and system for processing a graphics data stream in a computer graphics system having a parallel processing system. The graphics data stream includes a plurality of elements. The method and system of the present invention involve associating tags with elements in a graphics data stream, wherein each tag indicates a display order for the element associated with the tag. The elements are processed within a parallel processing system to produce processed elements, wherein each of the processed elements maintains an association with a tag. The processed elements are rasterized in a selected sequence to determine new pixel data sets, wherein rasterization of each processed element results in a new pixel data set for each of a plurality of pixels. Each new pixel data set includes order data derived from a tag associated with each of the processed elements. For each new pixel data set resulting from the rasterization of the processed elements, a current pixel data set is determined in response to a comparison of order data in the new pixel data set with order data in an existing pixel data set for each of the pixels. The pixels are then displayed within a display device utilizing the current pixel data sets associated with each of the pixels, wherein the plurality of elements is displayed in an order indicated by the associated tags to form a image.

14 Claims, 6 Drawing Sheets

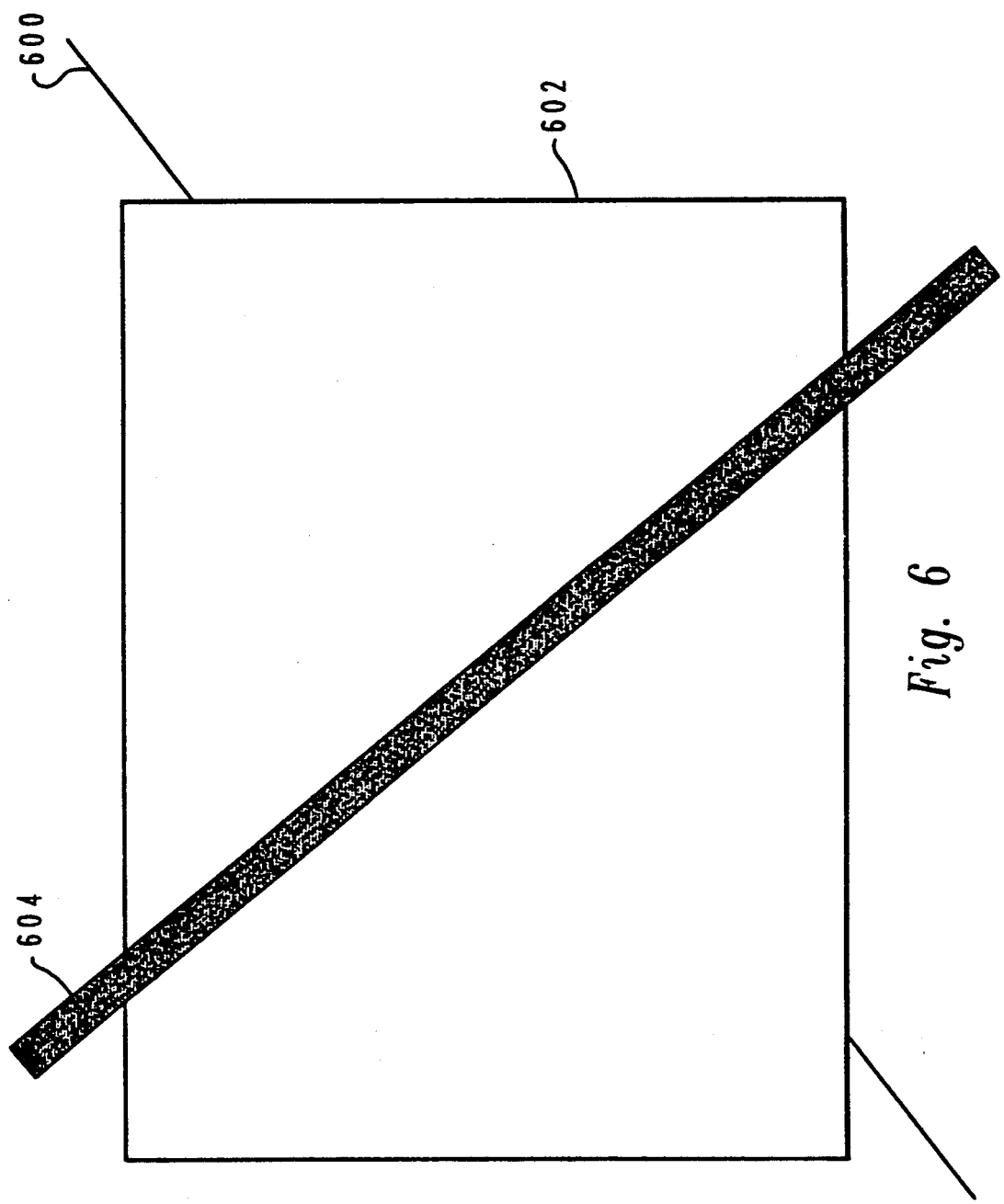

METHOD AND APPARATUS FOR DISPLAYING PRIMITIVES PROCESSED BY A PARALLEL PROCESSOR SYSTEM IN A SEQUENTIAL ORDER

BACKGROUND OF THE INVENTION

1. Technical Field

The present invention relates in general to a method and apparatus for producing a graphical image within a computer graphics system and in particular to a method and apparatus for parallel processing of graphics structure elements within a computer graphics system. Still more particularly, the present invention relates to a method and apparatus for displaying graphics structure elements processed by a parallel processor system in a computer graphics system in sequential order.

2. Description of the Related Art

Data processing systems such as personal computers and work stations are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis to model stress in structures. Other applications include chemical or molecular modelling applications. CAD/CAM/CASE applications are normally graphics intensive in terms of the information relayed to the user. Data processing system users may employ other graphics intensive applications such as desk top publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. It is desirable to be able to provide the performance required utilizing presently available technology. In order to meet the performance demands of users employing graphics applications, multiple floating point processors have been utilized to provide the computational power needed for higher performance.

Such multiprocessor graphics systems process data streams that include models containing primitives. A "primitive" defines the shape of various components of an object, such as lines, points, polygons in two or three dimensions, text, polyhedra, or free-form surfaces in three dimensions. A primitive also may define attributes, such as line style, color, or surface texture. Also, a primitive may include data defining connectivity relationships and positioning information that describe how the components of an object fit together. "Output primitives" are sent to a geometry engine, which is employed to perform calculations such as transformations, clipping, lighting calculations, perspective projections, color mapping, etc. "Raster primitives" are primitives resulting from the output from geometry engine which are sent to a rasterization engine, which is employed in operations such as the transformation of data into pixels and the evaluation of pixel values.

Often, primitives must be processed in sequential order. Many applications require that the geometry engine, utilized to process primitives and other data for display, maintain the sequential order of the primitives as received. For example, the painter's algorithm, a simplified version of a depth-sort algorithm, is a hidden-line/hidden-surface algorithm that is frequently employed in computer graphics applications to paint or render closer objects over more distant objects in situations not involving intersection of objects. This algorithm produces various primitives that are sent into a frame buffer in the order of farthest from the viewpoint to closest to the viewpoint in the viewing coordinate system in order to arrive at a correct visibility solution.

Normally, primitives are sorted based on Z-axis depth, (hereafter Z-depth), to ensure that the primitives are drawn from farthest to closest. The list of primitives, resulting from such a sorting, becomes the order in which the primitives are displayed. Other methods requiring processing of primitives to be maintained in sequential or temporal order (i.e., the time order in which the primitives are received) include binary spatial partitioning (BSP) algorithms, octree algorithms, and constructive solid geometry (CSG) trees.

With the introduction of multiple instruction multiple data (MIMD) pipelined geometry engines, it is possible, and often desirable, to process primitives in a non sequential order. Normally, each primitive is processed in sequential order and each subdrawing primitive derived from a primitive is given to the raster engine in display list priority. Primitive are rasterized by the raster engine to produce an image for display. "Rasterization" is the process of determining pixel values from primitives. In parallel processing systems, however, it is sometimes desirable to process a graphics data stream in a sequence other than that received to achieve efficient use of processor resources. Maintaining the original sequence of the primitives while maintaining efficient processor utilization is necessary in some cases.

One example where it is advantageous to process primitives in a non-sequential order involves a large nonuniform, rational B-spline (NURBS) surface followed by a large number of small triangle strips. It is often the case that the evaluation of NURBS surfaces requires a significantly longer time as compared to the calculations required for other primitives, such as lines, polygons, or triangle strips. If the processing of the NURBS is sequential, then whenever a NURBS surface is encountered, all other processors will remain idle after filling any available output buffers. Allowing the other processors to work on the lines, polygons, or other data while the NURBS surface is being processed improves the overall throughput by an amount equal to the reduced processor idle time.

One approach to this problem involves utilizing a mechanism to merge or multiplex data from a number of microprocessors and send the data to a rasterizer. Buffers are associated with each of the microprocessors for temporarily storing data not yet sent to the rasterizer. This solution is adequate in some situations. Cases, however, exist in which the limits imposed by this buffering mechanism cause processing at one node to halt until the primitive being processed at another processor or processor node has been completed. An example of one such case is a large primitive followed by one or more smaller primitives.

One method for dispatching work to a series of parallel processors in which the maintaining of a specific sequential order is necessary involves employing a control processor to parse the input data stream. This control processor also dispatches work in the form of primitives to one of a group of parallel processors. The parallel processor chosen for the next primitive is one that has the least amount of work awaiting at the input buffer of the parallel processor. As each primitive is dispatched by the control processor, a sequential tag is associated with each primitive. This tag accompanies the primitive and is utilized to merge the primitives processed by the various parallel processors back into the original sequential order prior to rasterization.

Utilizing this method, if one processor receives a NURBS surface, other processors within the parallel processing system may be forced to remain idle until the NURBS surface is completed by the processor because of the NURBS surface's position in the original display list. Consequently, the degree of parallelism possible is directly linked to the size of each processor's output buffer.

Although this method maintains the display list priority order by employing a tagging mechanism to maintain the order of primitives, situations involving inefficient processors use still exist. Additionally, the raster engine will have to wait for the geometry processing of one primitive to be completed before rasterization of another primitive can begin. Increasing the amount of memory for the processors may be inappropriate since an inordinate amount of storage space may be required to maintain efficient processor utilization for common data streams. Furthermore, increasing the buffer size has the undesirable effect of increasing the latency, that is, the start-up and emptying time associated with the graphics system.

Therefore, it is desirable to have a method and apparatus to improve the efficiency of parallel processing of data streams containing primitives while displaying the processed primitives in sequential order.

SUMMARY OF THE INVENTION

It is therefore one object of the present invention to provide a method and apparatus for producing a graphical image within a computer graphics system.

It is another object of the present invention to provide a method and apparatus for parallel processing of graphics structure elements within a computer graphics system.

It is yet another object of the present invention to provide a method and apparatus for displaying graphics structure elements processed by a parallel processor system in a computer graphics system in sequential order.

The foregoing objects are achieved as is now described. A method and system are disclosed for processing a graphics data stream in a computer graphics system having a parallel processing system, wherein the graphics data stream is comprised of a plurality of elements. The method and system of the present invention involve associating tags with elements in a graphics data stream, wherein each tag indicates a display position or order for the element associated with the tag. The elements are processed within a parallel processing system to produce processed elements, wherein each of the processed elements maintains an association with a tag. The processed elements are rasterized in a selected sequence to determine new pixel data sets, wherein rasterization of each processed element results in a new pixel data set for each of a plurality of pixels. Each new pixel data set includes order data derived from a tag associated with each of the processed elements. For each new pixel data set resulting from the rasterization of the processed elements, a current pixel data set is determined in response to a comparison of order data in the new pixel data set with order data in an existing pixel data set of each of the pixels. The pixels are then displayed within a display device utilizing the current pixel data sets associated with each of the pixels, wherein each of the plurality of elements is displayed in an order indicated by the associated tags.

Pixel data sets, including pixel data indicating the color and Z-depth of the pixels, are located in a frame buffer. These pixel data sets also preferably include order data, i.e., T-values or tags that indicate the display order of the elements and which are also stored in a T-buffer. These stored or existing T-values may be easily compared utilizing a comparator with the new T-values resulting from rasterization of processed elements. If the new T-value for a selected pixel is greater than the existing T-value for that pixel in the T-buffer, the new T-value is stored in the T-buffer and the new pixel data set for the pixel is sent to the frame buffer for display within the display device in the computer graphics system.

The above as well as additional objects, features, and advantages of the present invention will become apparent in the following detailed written description.

BRIEF DESCRIPTION OF THE DRAWINGS

The novel features believed characteristics of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is an illustration of a display created utilizing a T-buffer in accordance with a preferred embodiment of the present invention.

DETAILED DESCRIPTION OF PREFERRED EMBODIMENT

Figure 1:
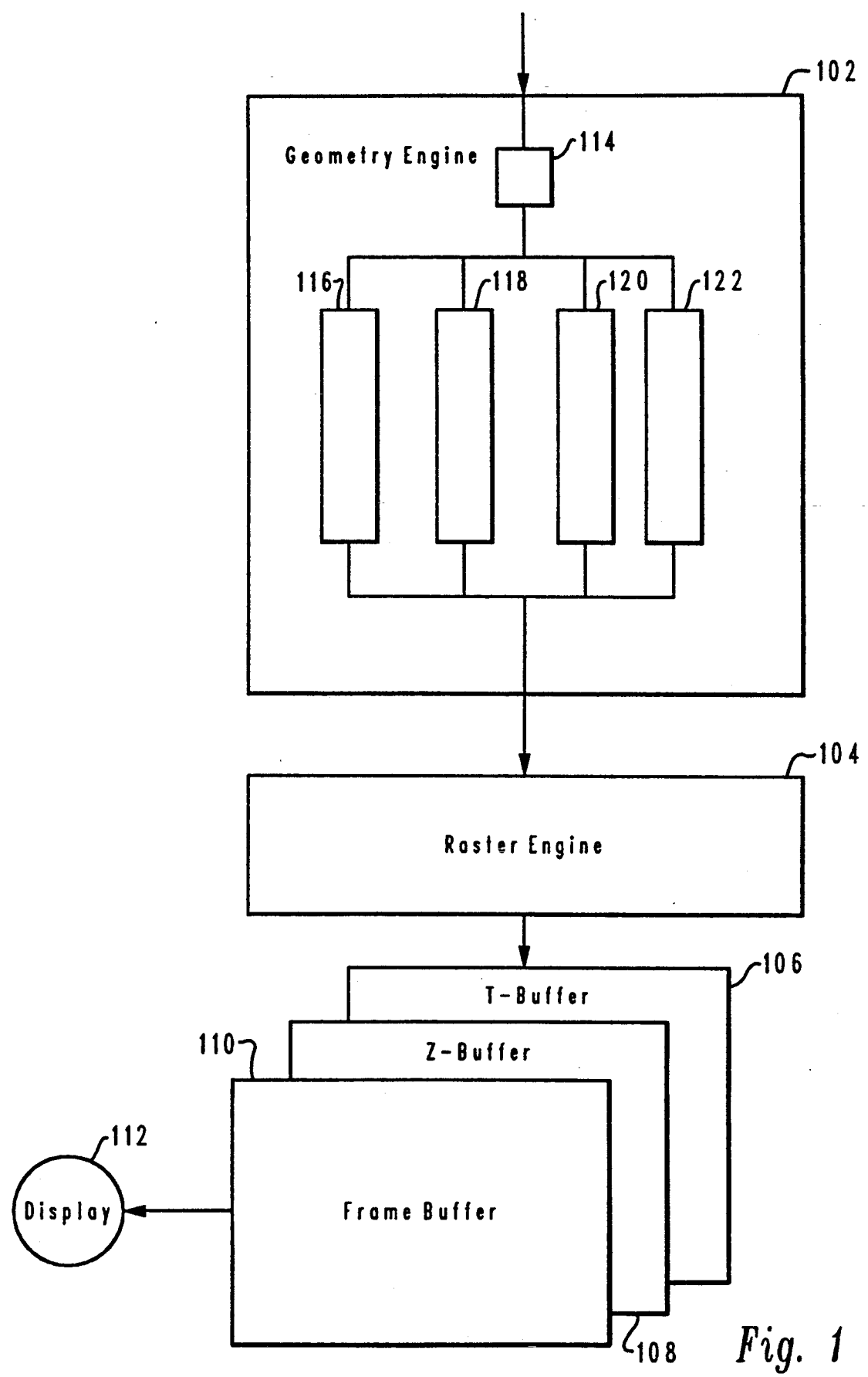
FIG. 1 depicts a block diagram of a system architecture of a graphics processing system for processing graphics data in accordance with a preferred embodiment of the present invention.

With reference now to the figures and in particular with reference to FIG. 1, there is depicted a block diagram of a system architecture of a graphics processing system for processing graphics data in a preferred embodiment of the present invention. The graphics processing system includes geometry engine 102, raster engine 104, T-buffer 106, Z-buffer 108, frame buffer 110, and display 112.

Geometry engine 102 receives a graphics data stream at distribution processor 114, which is employed to divide the graphics data stream into segments for distribution to microprocessor units 116, 118, 120, 122. These microprocessors units are coupled together in a parallel arrangement. Additionally, each of these microprocessor units may include one or more processors. Distribution processor 114 may be utilized to assign T-values or tags to each primitive in the graphics data stream to indicate the order of display for the primitives in accordance with a preferred embodiment of the present invention. Alternatively, T-values or tags may be assigned to each primitive by a software application. These T-values correspond to the order of the primitives in a display list. It will be understood by those skilled in the art that any number of microprocessor units can comprise geometry engine 102.

Microprocessor units 116, 118, 120 and 122 process primitives in the graphics data stream. Thereafter, the processed primitives are sent to raster engine 104, which transforms the processed primitives into pixels for display. Frame buffer 110 is a memory utilized to store data, such as pixel data sets indicating red, green, and blue (RGB) color for pixels. In accordance with a preferred embodiment of the present invention, T-buffer 106 may be a buffer located within frame buffer 110 and may be utilized to ensure that the rendering produced by the parallel processing system processing of primitives is correct with respect to the display list. T-buffer 106 stores information such as T-values (defined below) for each pixel on the display 112. Z-buffer 108 stores Z-axis data, (hereinafter "Z-data"), and may be employed to determine the visibility of an object in accordance with a preferred embodiment of the present invention. The T-values and Z-data make up order data. The pixels resulting from raster engine 104 are sent to frame buffer 110 and from frame buffer 110 to display 112 to form an image.

In accordance with a preferred embodiment of the present invention, rather than attempting to maintain the sequential processing of primitives before rasterization occurs, the primitives are sent to the raster engine immediately. An additional piece of information is associated with each primitive. This piece of information is also called a "tag" or a "T-value" and is preferably a number specifying the primitive's position within the display list in accordance with a preferred embodiment of the present invention. As an example of associating T-values, T-values may be sequentially associated with primitives as they are encountered. As a result, a larger T-value means that the primitive is farther down the sequence. Rasterization of a primitive results in a number of pixel data sets in which there is maintained order data for each pixel generated. Order data includes the T-values from the primitive resulting in the pixel data set. The existing T-value for a pixel in the T-buffer is compared with a new T-value associated with the pixel. If the new T-value associated with the pixel is greater than the existing T-value, (i.e., the new pixel is part of a primitive encountered later in the data stream) the pixel data set including color data is sent into the frame buffer and the T-value is placed into the T-buffer in place of the existing T-value.

Figure 2:
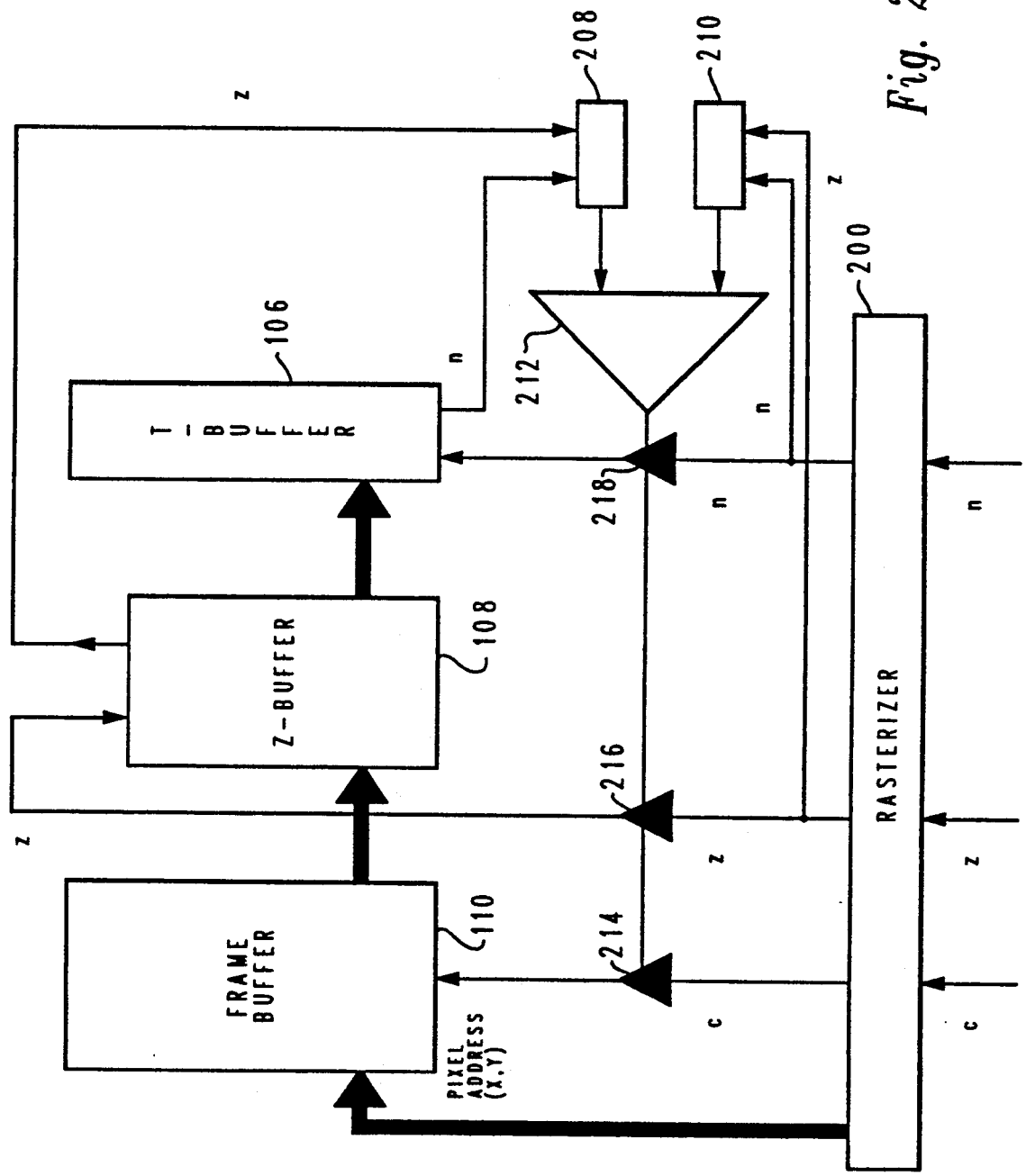
FIG. 2 is a schematic diagram of the control logic of a T-buffer and a Z-buffer in accordance with a preferred embodiment of the present invention.

Referring now to FIG. 2, a schematic diagram of the control logic for a T-buffer and a Z-buffer in accordance with a preferred embodiment of the present invention is depicted. Rasterizer 200 provides color data (c) to frame buffer 110, Z-data (z) to Z-buffer 108, and T-values (n) to T-buffer 106. Z-data and T-values are combined into a single value in block 208 and block 210. The Z-data and T-values are the order data utilized to determine which primitives are displayed. The T-values are placed into the least significant bits while Z-data is placed into the most significant bits in accordance with a preferred embodiment of the present invention.

Figure 3:
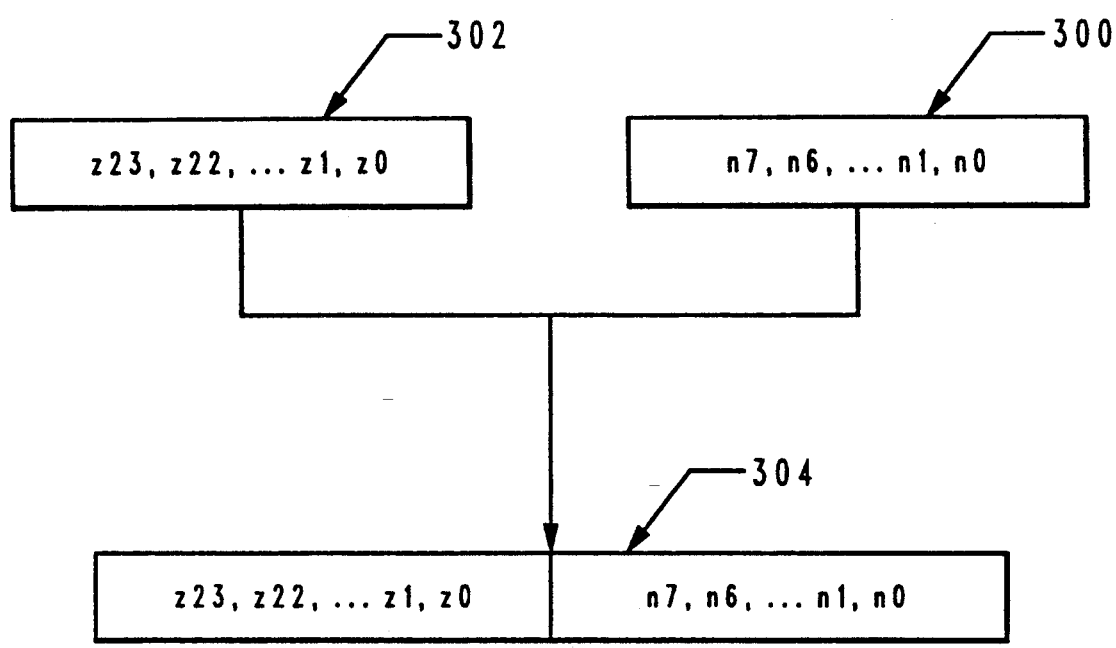
FIG. 3 depicts a diagram of T-value data and Z-data.

With reference to FIG. 3, a diagram of T-value data and Z-data is depicted. T-values occupy eight bits while Z-data occupies twenty-four bits in a thirty-two bit unit in accordance with a preferred embodiment of the present invention. As shown in FIG. 3, eight bit T-value 300 is combined with twenty-four bit Z-data 302 to form thirty-two bit value 304 in which the T-values occupy the least significant bits in accordance with a preferred embodiment of the present invention.

Referring back to FIG. 2, the thirty-two bit values generated in block 208 and 210 are compared to each other in comparator 212. The T-values and Z-data utilized by block 208 originate from T-buffer 106 and Z-buffer 108. Block 210 has T-values and Z-data input from rasterizer 200. As a result, the value generated by block 208 is a current value while the value generated by block 210 is a new value. If the new value is greater than the current value, comparator 212 activates logic units 214, 216, 218, resulting in frame buffer 110, Z-buffer 108, and T-buffer 106 being updated with data originating from rasterizer 200 in accordance with a preferred embodiment of the present invention. Otherwise the data is discarded. The data from rasterizer 200 includes pixel data sets resulting from the rasterization of the primitives. In the depicted embodiment, each pixel data set includes color data, Z-data, and a T-value in accordance with a preferred embodiment of the present invention. Other types of data may be contained in a pixel data set depending on a particular implementation of the present invention.

Other logic comparison functions such as less than, less than or equal to, greater than, or greater than or equal to may be implemented in comparator 212 in accordance with a preferred embodiment of the present invention. The depicted embodiment in FIG. 3 shows the Z-data and T-values being merged into a single value for comparison. Both the Z-data and the T-values are utilized as order data to determine which pixels are sent to the frame buffer for display. In accordance with a preferred embodiment of the present invention, the T-values and Z-data may be compared separately instead of as a combined value as depicted in FIG. 2.

Figure 4:
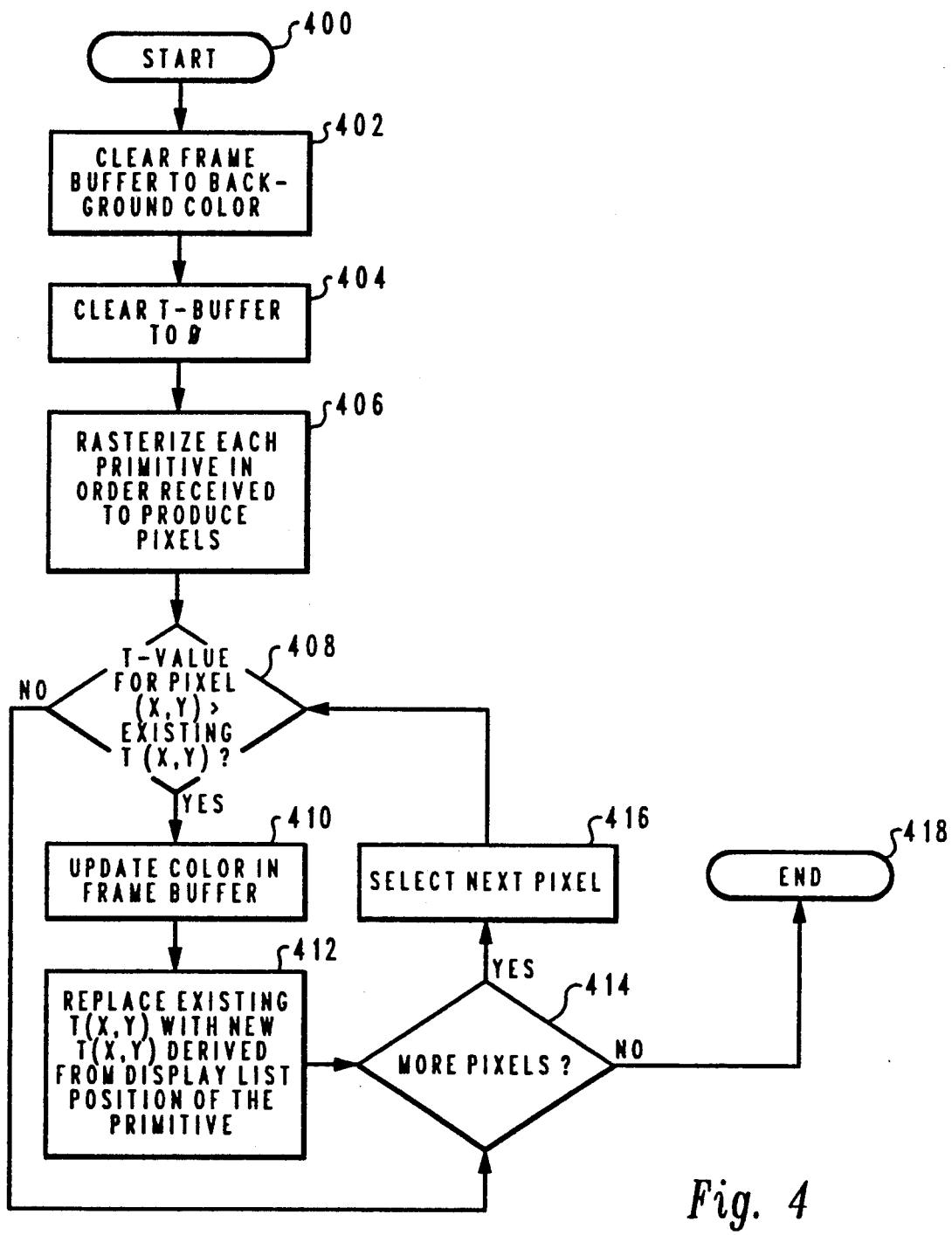
FIG. 4 is a logical flowchart of a method for displaying processed primitives including T-values in accordance with a preferred embodiment of the present invention.

With reference now to FIG. 4, a logical flowchart of a method for displaying processed primitives including T-values in accordance with a preferred embodiment of the present invention is depicted. The process begins as illustrated in block 400, and thereafter proceeds to block 402, which depicts the clearing of the frame buffer to a background color. The process then advances to block 404, which illustrates clearing the T-buffer to zero. The T-buffer may be cleared each time a screen is finished.

The process then proceeds to block 406, which depicts the rasterization of each primitive in the order received from the parallel processing system. The ordering of the primitives may be arbitrary and may not correspond to the order indicated in the display list. The rasterization of each primitive results in pixel data sets being generated for a number of pixels at various (X, Y) locations. These pixel data sets include new T-values. Next, the process proceeds to block 408, which illustrates a determination of whether or not the list position, represented by a T-value or T(X, Y) for a pixel at location (X, Y) is greater than the existing T-value or T(X, Y) in the T-buffer. If the new T(X, Y) for the pixel is greater than the existing T(X, Y) in the T-buffer, the process then proceeds to block 410, which depicts the updating of the color in frame buffer 110 by sending the new pixel data set for the pixel generated by the rasterizer to the frame buffer.

The process then advances to block 412, which illustrates the replacing of the existing T(X, Y) in the T-buffer 106 with the new T(X, Y) derived from the rasterized primitive. The process then proceeds to block 414, which depicts a determination of whether or not more pixels exist from rasterization. If more pixels exist, the process advances to block 416, which illustrates the selection of the next pixel for processing. The process then returns to block 408. Referring back to block 414, if more pixels are not present, the process then terminates as depicted in block 418.

Referring again to block 408, if the T-value for the pixel is not greater than the T-value in T-buffer (X, Y), the process moves to block 414 and continues as just described above.

Figure 5:
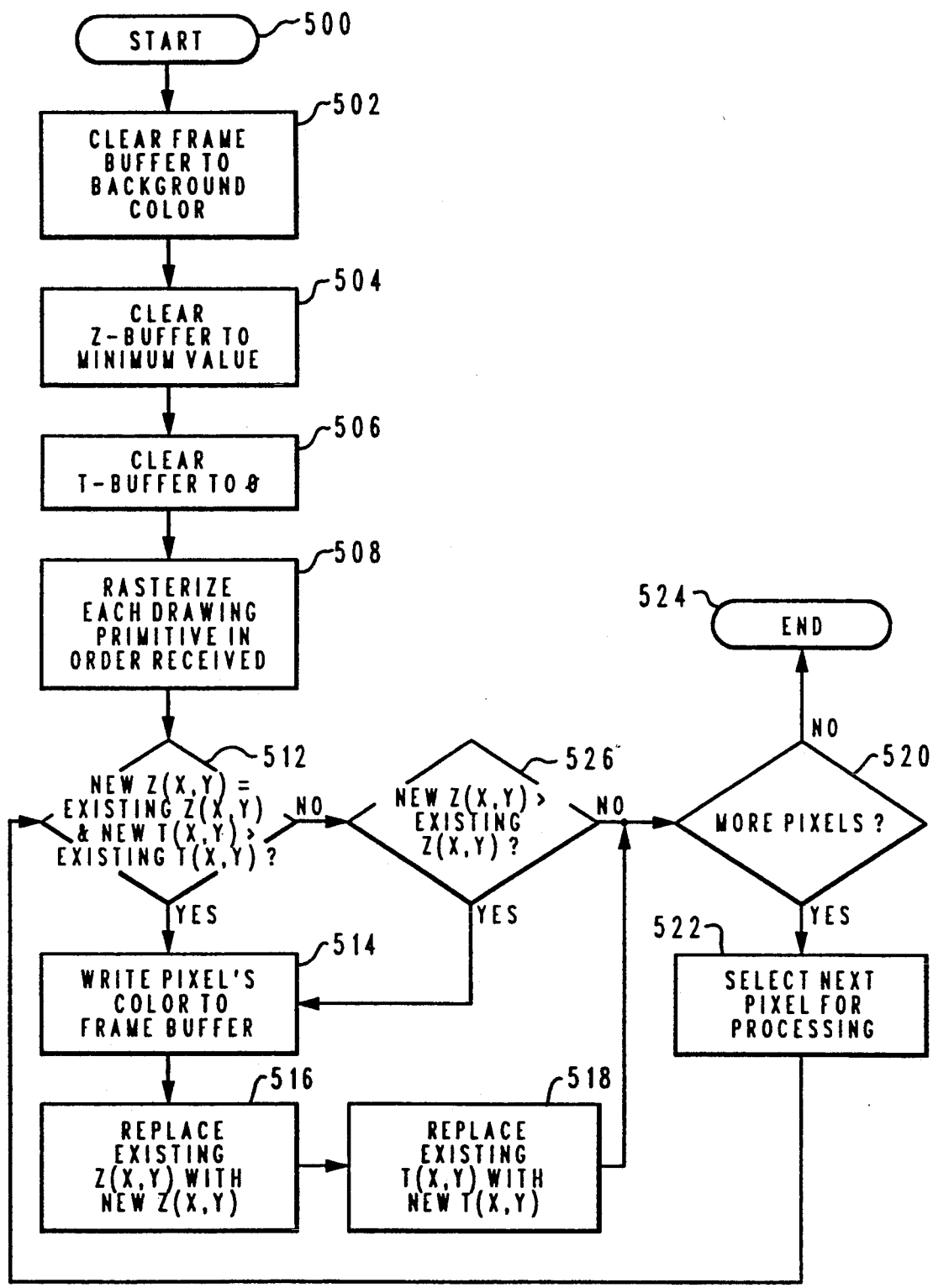
FIG. 5 depicts a logical flowchart of a method for displaying processed primitives including T-values and Z-data in accordance with a preferred embodiment of the present invention.

Referring next to FIG. 5, there is depicted a logical flowchart of a method for displaying processed primitives including T-values and Z-data in accordance with a preferred embodiment of the present invention. For illustrative purposes of this flowchart, large Z-data value imply a closer proximity to the user. For example, given two primitives having Z-data values ten and forty, the primitive having the Z-data value forty would be closer to the viewer than the primitive with the Z-data value ten. For clarity, Z-data and T-values are not merged together, but are compared separately. The process begins as illustrated in block 500 and thereafter proceeds to block 502, which depicts the clearing of the frame buffer to the background color. Afterward, the process advances to block 504, which illustrates the clearing of the Z-buffer to a selected minimum value. The process then proceeds to block 506, which depicts the clearing of the T-buffer to zero.

Next, the process continues to block 508, which illustrates the rasterization of each primitive in the order received from a parallel processing system in accordance with a preferred embodiment of the present invention. Rasterization of a primitive results in a new pixel data set, including color data, T-values or T(X, Y) and Z-data or Z(X, Y) for a number of pixels.

The process then advances to block 512, which depicts a determination of whether or not the new Z(X, Y) equals the existing Z(X, Y) in the Z-buffer and whether the new T-value or T(X, Y) is greater than the existing T-value or T(X, Y) in the T-buffer for the pixel at (X, Y). This decision block corresponds to the case in which a new pixel has an identical depth as the old pixel. If both of these conditions are true, the process the proceeds to block 514, which illustrates the writing of the pixel's color to the frame buffer. The process then advances to block 516, which depicts the replacing of the existing Z(X, Y) in the Z-buffer with the new Z(X, Y). In accordance with a preferred embodiment of the present invention, the existing Z(X, Y), in the Z-buffer is replaced with a new Z(X, Y) although this is not necessary depending on the implementation. Afterward, the process proceeds to block 518, which illustrates the replacing of the existing T(X, Y) in the T-buffer with the new T(X, Y).

Thereafter, the process advances to block 520, which illustrates a determination of whether or not more pixels exist for processing. If more pixels exist, the process then proceeds to block 522, which depicts selecting another pixel for processing. Thereafter the process returns to block 512. Referring back to block 520, if more pixels do not exist, the process terminates as depicted in block 524.

Referring back to block 512, if it is not the case that the new Z(X, Y) and the existing Z(X, Y) are equal and the new T(X, Y) for a pixel is greater than the existing T(X, Y) in the T-buffer for the pixel at location (X, Y), the process then must proceed to block 526, which illustrates a further determination of whether or not the new Z(X, Y) is greater than the existing Z(X, Y) in the Z-buffer at the location (X, Y). If the new Z(X, Y) is less than the existing Z(X, Y) in the Z-buffer (the new pixel is obstructed by the existing pixel), the color data, Z-data, and T-value are discarded. Thereafter, the process advances to block 520 and proceeds thereafter as already described.

Referring again to block 526, if the new Z(X, Y) is greater than the existing Z(X, Y), the process proceeds to blocks 514, 516, 518, 520, and 522 as described above.

In the depicted method and system of the present invention both the T-value or T(X, Y) derived from the display list order and the visibility of a point based on its Z depth are factors that may be processed in accordance with a preferred embodiment of the present invention. The T-values and the Z-data make up the order data in this particular flowchart. Normally, the visibility of an object has a higher priority than the display list position of the object.

It will be understood by one skilled in the art that the Z-buffer values may be reversed. This may be accomplished by means of a transformation in geometry engine 102.

With reference now to FIG. 6, there is depicted an illustration of a display created utilizing a T-buffer in accordance with a preferred embodiment of the present invention. Line 600 appears behind polygon 602 and wide line 604, since the primitive for line 600 has the smallest display list value or tag. Polygon 602 appears behind wide line 604 because the display list value for polygon 602 is less than wide line 604. Finally, wide line 604 is in front of both line 600 and polygon 602 since it has the largest display list value or tag. The resulting display does not depend on the order in which the three primitives for this display are rasterized.

Additionally, in the instance that determinations are based on Z-data and not on temporal processing, the same type of display depicted in FIG. 6 would created utilizing a Z-buffer. For example, polygon 602 is farther away than wide line 604. Z-data would be associated with primitives for the line and the polygon. As a result, if polygon 602 is rendered after wide line 604, polygon 602 would still appear behind wide line 604 by comparing the Z-data of the primitives representing these two objects.

The present invention differs from the past methods and systems in that the sequential order of primitives is not achieved by buffering primitives before rasterization. Instead, a novel method of utilizing frame buffer memory is disclosed.

It will be apparent to those skilled in the art that the present invention may be utilized to control other portions of the frame buffer such as an alpha buffer or a utility buffer.

Those of ordinary skill in the art will realize that the hardware disclosed could be reasonably implemented in software within a processor. Additionally, those of ordinary skill in the art will realize that the procedures disclosed could be reasonable implemented in hardware to form the present invention.

While the invention has been particularly shown and described with reference to a preferred embodiment, it will be understood by those skilled in the art that various changes in form and detail may be made therein without departing from the spirit and scope of the invention.

What is claimed is:

1. A method for processing a graphics data stream in a computer graphics system having a parallel processing system, wherein said graphics data stream is comprised of a plurality of elements, said method comprising the computer implemented steps of:
   associating a selected one of a plurality of tags with each of a plurality of elements in a graphics data stream, wherein each of said plurality of tags indicates a display order for an associated one of said plurality of elements;
   processing said plurality of elements within a parallel processing system to produce a plurality of processed elements, each of said plurality of processed elements maintaining an association with a selected one of said plurality of tags;
   rasterizing each of said plurality of processed elements in a selected sequence to determine a plurality of new pixel data sets, wherein rasterization of each processed element results in a plurality of new pixel data sets for a plurality of pixels, each new pixel data set including order data derived from a tag associated with each of said plurality of processed elements;
   for each new pixel data set resulting from said rasterization of said plurality of processed elements, determining a current pixel data set in response to a comparison of order data in said new pixel data set with order data in an existing pixel data set for each of said plurality of pixels; and
   displaying said plurality of pixels within a display device utilizing a plurality of current pixel data sets associated with said plurality of pixels as determined in said determining step, wherein said elements are displayed in said order indicated by said plurality of tags within said display device to form an image.

2. The method of claim 1, wherein said determination of a current pixel data set includes comparing said order data in said new pixel data set with order data in an existing pixel data set for each of said plurality of pixels and replacing said existing pixel data set with said new pixel data set if said order data for said new pixel data set is greater than said order data for said existing pixel data set.

3. The method of claim 2, wherein said determination of a current pixel data set for each of a plurality of pixels includes maintaining said existing pixel data set if said order data for said new pixel data set is less than said existing pixel data set.

4. A computer graphics system for processing a graphics data stream utilizing a parallel processing system, wherein said graphics data stream is comprised of a plurality of elements, said computer graphics system comprising:
   association means for associating a selected one of a plurality of tags with each of a plurality of elements in a graphics data stream, wherein each of said plurality of tags indicates a display order for an associated one of said plurality of elements;
   processing means for processing said plurality of elements within a parallel processing system to produce a plurality of processed elements, each of said plurality of processed elements maintaining an association with a selected one of said plurality of tags;
   rasterization means for rasterizing each of said plurality of processed elements in a selected sequence to determine a plurality of new pixel data sets, wherein rasterization of each processed element results in a plurality of new pixel data sets for a plurality of pixels, each new pixel data set including order data derived from said tag associated with each of said plurality of processed elements;
   determination means for determining a current pixel data set for each new pixel data set resulting from said rasterization of said plurality of processed elements in response to comparison means for comparing order data in said new pixel data set with order data in an existing pixel data set for each of said plurality of pixels; and
   display means for displaying said plurality of pixels within a display device utilizing a plurality of current pixel data sets associated with said plurality of pixels as determined in said determining step, wherein said elements are displayed in said order indicated by said plurality of associated tags within said display device.

5. The computer graphics system of claim 4, wherein said determination means includes comparison means for comparing said order data in said new pixel data set with order data in an existing pixel data set for each of said plurality of pixels and means for replacing said existing pixel data set with said new pixel data set if said order data for said new pixel data set is greater than said order data for said existing pixel data set.

6. The computer graphics system of claim 5, wherein said determination means includes means for maintaining said existing pixel data set if said order data for said new pixel data set is less than said existing pixel data set.

7. The computer graphics system of claim 6, wherein said plurality of existing pixel data sets are located in a memory.

8. The computer graphics system of claim 7, wherein said order data for each of said plurality of existing pixel data sets is stored in a buffer in said memory.

9. The computer graphics system of claim 8, wherein each of said plurality of existing pixel data sets includes pixel data defining a color for each of said plurality of pixels.

10. The computer graphics system of claim 9, wherein each of said plurality of existing pixel data sets includes pixel data defining a Z-depth value for each of said plurality of pixels.

11. The computer graphics system of claim 7, wherein said comparison means for comparing order data for a new pixel data with order data for an existing data set is performed by a comparator.

12. A computer graphics system for processing a graphics data stream utilizing a parallel processing system, wherein said graphics data stream is comprised of a plurality of elements, said computer graphics system comprising:
   association means for associating a selected one of a plurality of tags with each of a plurality of elements in a graphics data stream, wherein each of said plurality of tags indicates a display order for an associated one of said plurality of elements;

processing means for processing said plurality of elements within a parallel processing system to produce a plurality of processed elements, each of said plurality of processed elements maintaining an association with a selected one of said plurality of tags;

rasterization means for rasterizing each of said plurality of processed elements in a selected sequence to determine a plurality of new pixel data sets, wherein rasterization of each processed element results in a plurality of new pixel data sets for a plurality of pixels, each new pixel data set including order data derived from said tag associated with each of said plurality of processed elements, wherein said order data includes a T-value indicating display priority for a pixel;

determination means for determining a current pixel data set for each new pixel data set resulting from said rasterization of said plurality of processed elements, in response to comparison means for comparing order data in said new pixel data set with order data in an existing pixel data set for each of said plurality of pixels, said determination means including:

comparison means for comparing said order data in said new pixel data set with order data in an existing pixel data set for each of said plurality of pixels and means for replacing said existing pixel data set with said new pixel data set if said order data for said new pixel data set is greater than said order data for said existing pixel data set; and means for maintaining said existing pixel data set if said order data for said new pixel data set is less than said existing pixel data set, said plurality of existing pixel data sets are located in a memory; and display means for displaying said plurality of pixels within a display device utilizing a plurality of current pixel data sets associated with said plurality of pixels as determined in said determining step, wherein said elements are displayed in said order indicated by said plurality of associated tags within said display device.

13. The computer graphics system of claim 7, wherein said order data includes Z-data indicating depth for a pixel.

14. The computer graphics system of claim 4, wherein said determination of a current pixel data set includes comparison means for comparing said order data in said new pixel data set with order data in an existing pixel data set for each of said plurality of pixels and means for replacing said existing pixel data set with said new pixel data set for said pixel if said order data for said new pixel data set is greater than said order data for said existing pixel data set.

* * * * *